Aug. 18, 1936.　　P. H. TRAVIS　　2,051,757
WEATHER STRIP
Filed April 29, 1935　　2 Sheets-Sheet 1
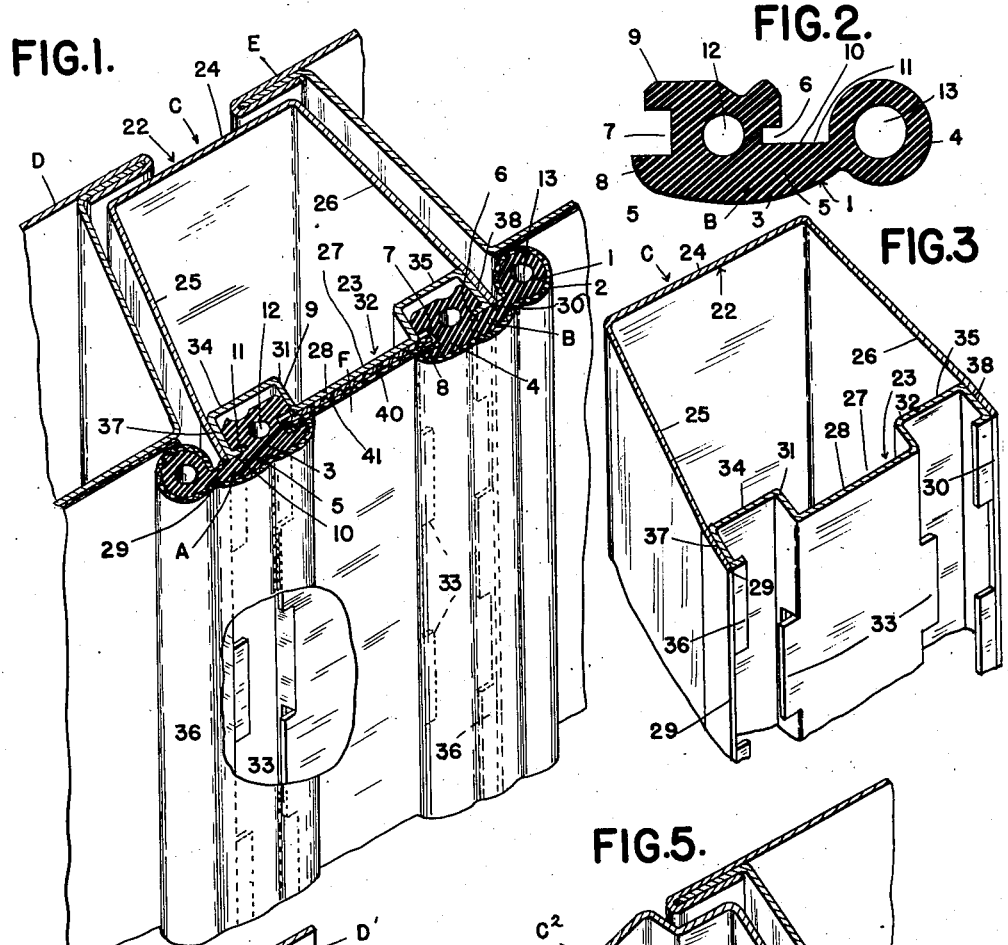
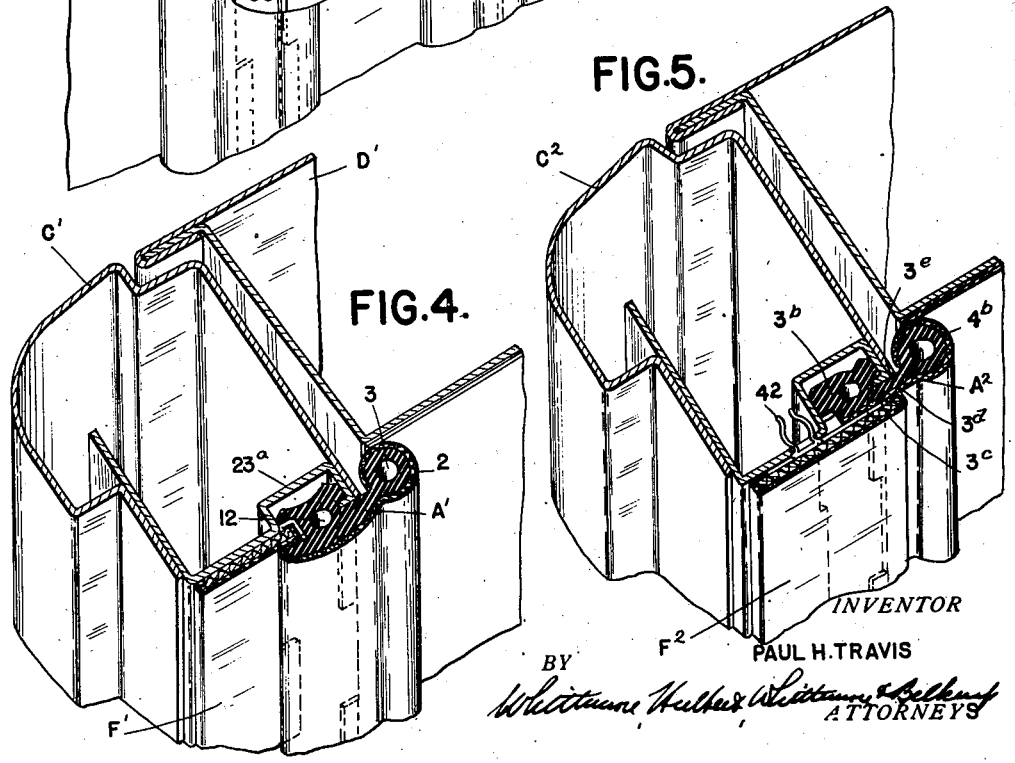
INVENTOR
PAUL H. TRAVIS
BY
ATTORNEYS

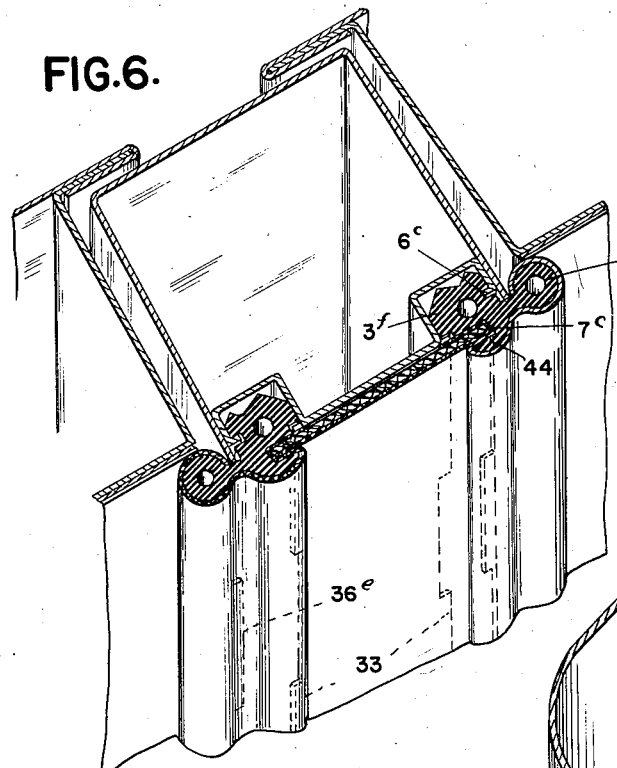
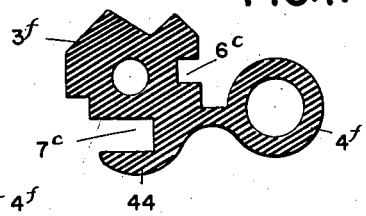
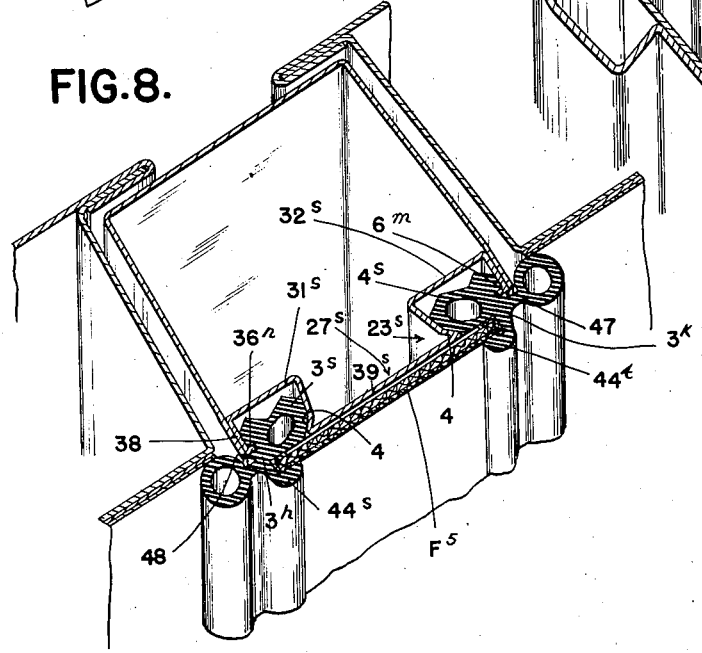
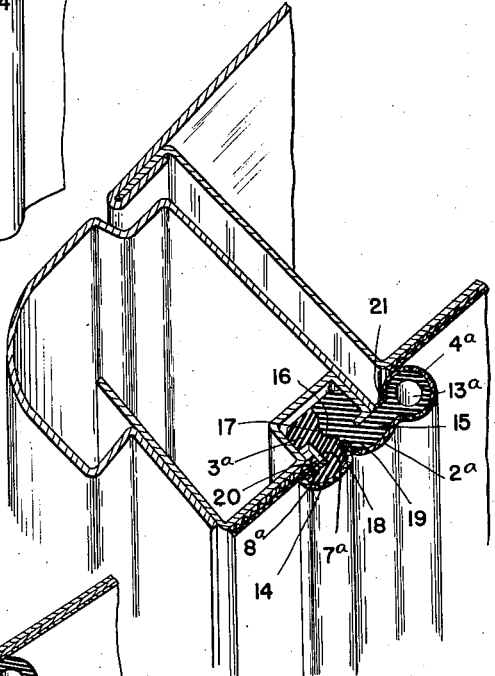

Patented Aug. 18, 1936

2,051,757

UNITED STATES PATENT OFFICE 2,051,757

WEATHER STRIP

Paul H. Travis, Detroit, Mich.

Application April 29, 1935, Serial No. 18,939

15 Claims. (Cl. 20—69)

This invention relates generally to weather strip assemblies and refers more particularly to weather strips for use in metallic vehicle body constructions.

Heretofore it has been customary when applying weather strips at the edges of door openings in vehicle bodies to interpose laterally extending webs or flanges of such strips between the metal framework of the body and suitable trim panels, and to fasten such strips in place by tacking the webs thereof and the trim panels to suitable retainer strips anchored in or on the framework of the body. However, such an application makes it necessary for the trim panel to be positioned and held accurately relative to the weather strip, and this of necessity requires considerable assembly time. Usually the weather strip and trim panel are tacked separately to the retainer strips, and this not only makes the mounting of such parts insecure, but also permits the cardboard forming the backing for the fabric covering of the trim panels to warp due to exposure to the weather elements.

When applying a weather strip in the manner just mentioned, the correct alignment, spacing, and positioning of the parts and the number of tacks used is dependent entirely upon the skill and accuracy of the workman. When the webs of the weather strips are fastened with tacks to retainer strips at opposite side edges of a pillar forming a jamb for two doors of a vehicle body, it is customary to mount a trim panel over said webs and fasten such panel to the pillar by relatively long tacks which have their heads anchored in the cardboard backing of the trim panel and have their shanks anchored in suitable bushings carried by the pillar intermediate opposite side edges thereof. Usually the retainer strips are received within channels at opposite side edges of the pillar and are held in place by prongs or tongues which are initially struck out from the pillar intermediate the channels and then bent over the strips. Beside this elaborate assembly of various parts, there is a decided disadvantage from a practical viewpoint, i. e., the opposite side edges of the trim panel are usually remote from the tacks anchored midway of opposite side edges of the pillar, hence the trim panel is subjected to a bending action when the weather strips are engaged by the doors, and in time dislodges the weather strips and causes them to become useless and inoperative. Ordinarily it is difficult to mount the trim panel upon the pillar in accurate relation to the weather strips as aforesaid, but even when this is accomplished, the trim panel creates a stiff mounting for the weather strips, especially on the outer sides thereof at the juncture of the webs and wind cord portions thereof and thus reduces the elastic action of the weather strips. Due to the pressure exerted against the wind cord portions of the weather strips by the doors when closed, there is also a tendency of the inner sides of the weather strips at the juncture of the webs and wind cord portions thereof to tear or otherwise become warped or inoperative. Moreover, opposite side edges of the trim panel do not remain even and straight when subjected to weather conditions, due primarily to the manner in which the trim panel is mounted on the pillar. As a result, not only the weather strips but the trim panel as well become loose and unsightly.

With my invention, however, the objectionable features just mentioned have been dispensed with entirely and the weather strips and trim panels may be applied by any workman without previous experience or skill to pillars or other suitable framework of vehicle bodies regardless of whether they are formed accurately or not, and will produce a first class, neat appearing assembly.

One of the essential objects of my invention is to provide a weather strip that may be readily manufactured at a comparatively low cost and that may be easily and quickly applied to the pillar or other supporting framework of the vehicle body.

Another object is to provide a weather strip that will compensate for inaccuracies and variations in the pillar or other supporting member to which it is applied.

Another object is to provide a weather strip that is self-retaining after being applied, whereby separate fastening elements such as tacks, screws, etc., may be dispensed with entirely.

Another object is to provide a weather strip wherein provision is made for holding the trim panel in place on the pillar, whereby separate fastening elements for said panel and tacking or retainer strips may likewise be dispensed with entirely.

Another object is to provide a weather strip wherein the holding means just mentioned is so constructed that the trim panel will be held tightly and firmly throughout its entire area on the pillar.

Another object is to provide a weather strip wherein the holding means referred to is so constructed that warping and distortion of the trim panel will be obviated.

Another object is to provide a weather strip that is mounted in such a way that contact between the wind cord portion thereof and the door when the latter is closed will be constant, whereby drafts will be effectively prevented from passing between the pillar and door.

Another object is to provide a weather strip that is elastic in formation and that will retain its elasticity without tearing or taking a set position.

Another object is to provide a weather strip that eliminates the influence of weather conditions on the trim panel and makes it possible to use a cheaper grade of cardboard as a backing for said trim panel.

Other objects, advantages and novel details of construction of this invention will be made more apparent as this description proceeds, especially when considered in connection with the accompanying drawings, wherein:

Figure 1 is a fragmentary perspective view of a weather strip assembly embodying my invention;

Figure 2 is a detail cross sectional view through one of the weather strips;

Figure 3 is a fragmentary perspective view of the pillar or jamb for the doors of the vehicle body before the trim panel and weather strips have been applied thereto;

Figure 4 is a fragmentary perspective view of a slight modification;

Figure 5 is a fragmentary perspective view of another modification;

Figure 6 is a fragmentary perspective view of another modification;

Figure 7 is a detail cross sectional view through one of the weather strips illustrated in Figure 6;

Figure 8 is a fragmentary perspective view of another modification;

Figure 9 is a fragmentary perspective view of another modification.

Referring now to the drawings, A and B, respectively, are weather strips embodying my invention, and C is a supporting pillar therefor and forming a part of the framing for the usual door openings of the vehicle body. D and E, respectively, are doors constituting closures for the openings in the vehicle body, and F is a trim panel mounted on the pillar C and held in position thereon by said weather strips A and B.

As shown, the weather strips A and B are alike and are engageable by the doors D and E when the latter are closed. Preferably, each weather strip comprises a strip 1 of resilient material such as plain or sponge rubber or rubber composition and a covering 2 of fabric or other suitable material. The strip 1 may be formed in one piece as illustrated in Figures 1 and 2 or may be formed in two pieces as illustrated in Figure 9. In either event, the strip 1 is provided longitudinally thereof with laterally spaced bodies 3 and 4 and an intermediate connecting web 5 which are uniform in cross section throughout their length.

Preferably, the body 3 is relatively thick and is provided in opposite side edges thereof with outwardly opening grooves 6 and 7, respectively. The outer wall 8 of the groove 7 projects laterally beyond the inner wall 9 of said groove, while the outer wall 10 of the groove 6 is substantially flush with the inner face 11 of the web 5 so that the latter forms a lateral extension or continuation of said outer wall 10. Preferably, the groove 7 is larger than the groove 6 for a purpose to be hereinafter more fully set forth.

The body 4 is substantially cylindrical in configuration and is substantially parallel to the body 3. When the strip 1 is in one piece, as in Figures 1 and 2, the bodies 3 and 4 are provided at the center thereof with longitudinally extending holes 12 and 13, respectively. The fabric covering 2 extends over and is secured to the outer faces of the bodies 3 and 4 and intermediate web 5 and is folded around and secured to the cylindrical body 4 and outer wall 8 of the groove 7. However, the strip 1 may comprise two pieces or sections such as 14 and 15 as in Figure 9, and in such case only the outer body 4ᵃ has a longitudinally extending hole 13ᵃ. The inner body 3ᵃ is divided longitudinally and is provided at this division point with a mating tongue 16 and groove 17. The fabric covering 2ᵃ is likewise divided and extends over and is secured to the outer faces of both pieces 14 and 15 of the strip. Preferably, portions 18 and 19, respectively, of the covering 2ᵃ are folded over and secured to the opposed faces of said pieces, while other portions 20 and 21, respectively, of said covering are folded around and secured to the outer wall 8ᵃ of the groove 7ᵃ in the body 3ᵃ and the cylindrical body 4ᵃ.

The pillar C is preferably formed of sheet metal and comprises a channel section 22 and a pressed metal reinforcement 23. Preferably, the channel section 22 opens inwardly and is closed by the reinforcement 23. In fact, the reinforcement 23 cooperates with the base 24 and sides 25 and 26, respectively, to form a box-like pillar. The reinforcement 23 has a channel-shaped portion 27 opening inwardly with the base 28 of said channel portion substantially in line with the inner edges 29 and 30 of the channel section 22, and is provided at opposite sides of said channel-shaped portion 27 with outwardly opening channels 31 and 32, respectively, that are welded to the sides 25 and 26 of the channel section 22. Preferably, tongues 33 are struck out from opposite sides of the inwardly opening channel 27 so as to extend into the outwardly opening channels 31 and 32 in substantially parallel relation to the bases 34 and 35 thereof, while other tongues 36 are turned inwardly from the outer walls 37 and 38, respectively, of the outwardly opening channels 31 and 32 so as to extend substantially parallel to the bases 34 and 35 of said channels. By referring to Figure 1, it will be noted that the tongues 33 and 36 are alternately arranged and are substantially in line with the base 28 of the inwardly opening channel 27.

The trim panel F is mounted on the base 28 of the inwardly opening channel 27 between the weather strips A and B and preferably comprises a cardboard backing 40 and a fabric covering 41.

To assemble the weather strips A and B and trim panel F with the pillar C, the trim panel F is applied first to the base 28 of the channel-shaped portion 27 of the reinforcement 23. The body portions 3 of the weather strips A and B are then pressed into the channels 31 and 32 so that the tongues 36 will be received in the grooves 6 and the tongues 33 and adjacent edge portions of the trim panel F will be received in the grooves 7. Thus, both the weather strips A and B and trim panel F will be effectively held against displacement by the engagement of the tongues 33 and 36 with the grooves 7 and 6 in the bodies 3 of the weather strip. When assembled, the bodies 4 are disposed beyond the sides 25 and 26 of the pillar in position to be engaged by the doors D and E when closed and thus effectively form wind cords to prevent drafts from passing between said doors and pillar.

In Figure 4, I have illustrated a slight modification in which the pillar C¹ constitutes a jamb for only one door such as D¹. With this construction the trim panel F¹ is mounted on the reinforcement 23ᵃ and is engaged by only one weather strip such as A¹.

In Figure 5, I have illustrated another modification in which the pillar C² substantially corresponds to the pillar C¹, but the trim panel F² is fastened to the pillar by prongs such as 42 and overlaps the weather strip A². In this construction the body 3ᵇ of the wind cord is thinner and has a substantially flat outer face 3ᶜ substantially flush with the flat outer face 3ᵈ of the web 3ᵉ, whereby the trim panel F² may overlie both the body 3ᵇ and web 3ᵉ and terminate adjacent the cylindrical body 4ᵇ of the weather strip.

In Figures 6 and 7, I have illustrated another modification in which the tongues 33ᶜ and 36ᶜ and grooves 6ᶜ and 7ᶜ are staggered, and the outer face 44 of the body 3ᶠ is narrower. Likewise, the cylindrical body 4ᶠ is closer to the body 3ᶠ, as clearly illustrated in Figure 7.

In Figure 8, I have illustrated another modification in which the bodies 3ʰ and 3ᵏ are provided with grooves 6ᵐ for the reception of tongues 36ⁿ extending inwardly from the outer sides 38 of the channels 31ˢ and 32ˢ and are provided with beveled portions 45 for engagement with the undersides of overhanging portions 46 of the reinforcement 23ˢ. Preferably, the tongues 36ⁿ are substantially in line with the inner edges 47 and 48, respectively, of the pillar, while the overhanging portions 46 are offset relative thereto and are at the base 39ˢ of the channel portion 27ˢ of said reinforcement which forms a seat for the trim panel F⁵. In this construction the outer faces 44ˢ and 44ᵗ of the bodies 3ˢ and 4ˢ are also narrow as in Figures 6 and 7.

What I claim as my invention is:

1. A weather strip formed of flexible material and having laterally spaced longitudinally extending bodies and an intermediate connecting web, one of said bodies having grooves in opposite sides thereof for receiving parts of a supporting pillar, one of said grooves being large enough to also receive an edge of a trim panel for the pillar.

2. A weather strip formed of flexible material and having laterally spaced longitudinally extending bodies and an intermediate connecting web, one of said bodies having grooves in opposite sides thereof for receiving parts of a supporting pillar, a portion of said grooved body being formed to overlie and hold a trim panel against said pillar.

3. A weather strip formed of flexible material and having laterally spaced longitudinally extending bodies and an intermediate connecting web, one of said bodies having grooves in opposite sides thereof for receiving parts of a supporting pillar, said grooved body also having means for holding a trim panel against said pillar.

4. A combined finish strip and wind cord for the framing of an opening in a vehicle body provided with a closure for the opening, comprising two laterally spaced bodies and an intermediate connecting web, one of said bodies being provided at opposite sides thereof with means for releasable attachment along an edge of said frame, the other of said bodies being adapted to overlie and constitute an abutment for the closure.

5. A combined finish strip and wind cord for the framing of an opening in a vehicle body provided with a closure for the opening, comprising two laterally spaced bodies and an intermediate connecting web, one of said bodies being provided in opposite sides thereof with grooves for receiving portions of said framing, one side of one of said grooves having a projecting edge portion to overlie an edge of a trim panel for the framing, the other of said bodies being adapted to overlie and form an abutment for the closure.

6. A weather strip having laterally spaced bodies and an intermediate connecting web, one of said bodies being provided at opposite sides thereof with means for releasable attachment to a supporting pillar, the other of said bodies forming an abutment for a door.

7. A weather strip having laterally spaced bodies and an intermediate connecting web, one of said bodies being provided in opposite sides thereof with grooves for the reception of portions of a supporting pillar, the other of said bodies forming an abutment for a door.

8. A weather strip having a body provided at opposite sides thereof with means for releasable attachment to a supporting pillar, and a body connected to the body aforesaid in laterally spaced relation thereto and forming an abutment for a door.

9. A weather strip having a body provided in opposite sides thereof with grooves for receiving spaced portions of a supporting pillar, and a body connected to the body aforesaid in laterally spaced relation thereto and forming an abutment for a door.

10. A weather strip having an elongated body for insertion into a channel portion of a supporting pillar, opposite sides of said body having means for receiving projections on opposite sides of said channel whereby the body will be held against displacement from the channel, and yieldable means projecting laterally from said body for abutting engagement with a door.

11. A weather strip having an elongated body for insertion into a channel portion of a supporting pillar, opposite sides of said body having means for receiving the projections on opposite sides of said channel whereby the body will be held against displacement from the channel, one of said means being formed to receive and hold an edge portion of a trim panel for the pillar.

12. A weather strip having an elongated body for insertion into a channel portion of a supporting pillar, opposite sides of said body having means for receiving projections on opposite sides of said channel whereby the body will be held against displacement from the channel, a part of said body being formed to overlie an edge of a trim panel for the pillar.

13. A weather strip having laterally spaced longitudinally extending elongated bodies and an intermediate connecting substantially flat web, one of said elongated bodies having longitudinally extending outwardly opening grooves in opposite sides thereof for receiving parts of a supporting pillar, one of said grooves being large enough to also receive an edge of a trim panel for the pillar.

14. A weather strip having an elongated body provided in opposite sides thereof with longitudinally extending outwardly opening grooves for receiving parts of a supporting pillar, one of said grooves being large enough to also receive an edge of a trim panel for the pillar.

15. A weather strip having an elongated body of relatively flexible material for conforming to irregular contours of a supporting frame, one side of said elongated body having a longitudinally extending channel for receiving a part of said supporting frame, and the other side of said elongated body having means for receiving another portion of said supporting frame and an edge of a trim panel for said frame.

PAUL H. TRAVIS.